United States Patent
Wells et al.

(10) Patent No.: US 10,766,106 B2
(45) Date of Patent: Sep. 8, 2020

(54) DRIVE SHAFT PRESS

(71) Applicant: Toyota Motor Engineering & Manufacturing North America, Inc., Erlanger, KY (US)

(72) Inventors: Keith J. Wells, Evansville, IN (US); Robert D. McClain, Haubstadt, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 498 days.

(21) Appl. No.: 15/095,118

(22) Filed: Apr. 10, 2016

(65) Prior Publication Data

US 2017/0291269 A1    Oct. 12, 2017

(51) Int. Cl.
| | |
|---|---|
| *B23P 19/02* | (2006.01) |
| *F16H 57/023* | (2012.01) |
| *F16H 48/38* | (2012.01) |
| *F16H 57/00* | (2012.01) |

(52) U.S. Cl.
CPC .............. *B23P 19/02* (2013.01); *F16H 48/38* (2013.01); *F16H 57/023* (2013.01); *F16H 2048/382* (2013.01); *F16H 2057/0043* (2013.01)

(58) Field of Classification Search
CPC .... B25B 5/06; B25B 5/08; B25B 5/14; B25B 5/122; B25B 5/147; B25B 9/00; B23P 19/02; B23P 19/10; F16H 57/023; F16H 48/38; B25J 15/026
USPC ................. 29/237; 294/119.1, 207
See application file for complete search history.

(56) References Cited

U.S. PATENT DOCUMENTS

| | | | | |
|---|---|---|---|---|
| 2,390,293 A | * | 12/1945 | Colson | B66C 1/66 |
| | | | | 212/332 |
| 3,653,115 A | * | 4/1972 | Perkins | F16L 1/09 |
| | | | | 254/29 R |
| 3,670,912 A | * | 6/1972 | Dunbar | B66C 1/66 |
| | | | | 414/420 |
| 3,905,632 A | * | 9/1975 | Caylor | B66C 1/30 |
| | | | | 294/119.1 |

(Continued)

FOREIGN PATENT DOCUMENTS

JP     2015016516 A     1/2015

*Primary Examiner* — Lee D Wilson
*Assistant Examiner* — Seahee Hong
(74) *Attorney, Agent, or Firm* — Christopher G. Darrow; Darrow Mustafa PC

(57) ABSTRACT

A simplified drive press system is operable to press-fit a pair of first workpieces into a second workpiece. The drive press system uses a simplified mechanical arrangement to translate an input torque into movement of a pair of drive arms toward and away from one another. Yokes of differing configurations may be attached to the drive arms to accommodate a variety of different workpieces. A nut runner may be used to supply a drive torque to the gear assembly and provide a controlled input torque and control the movement of the drive arms. An overall reduction may be utilized that balances a desired movement resolution with the desire to detect changes in input torque. The nut runner may be programmable to provide a desired movement of the drive arms while monitoring the input torque to detect when a fully press-fitted condition is realized.

19 Claims, 8 Drawing Sheets

(56) References Cited

U.S. PATENT DOCUMENTS

| | | | | |
|---|---|---|---|---|
| 4,579,380 A | * | 4/1986 | Zaremsky | B25J 13/082 |
| | | | | 294/119.1 |
| 4,842,473 A | * | 6/1989 | Zbornik | B21D 43/105 |
| | | | | 294/188 |
| 4,968,077 A | * | 11/1990 | Rednnon, Jr. | B25B 5/06 |
| | | | | 294/119.1 |
| 5,360,248 A | * | 11/1994 | Jones | B66C 1/42 |
| | | | | 294/87.1 |
| 7,824,132 B1 | * | 11/2010 | White | E02D 7/18 |
| | | | | 175/171 |
| 8,109,852 B2 | * | 2/2012 | Lee | F16H 3/76 |
| | | | | 475/16 |
| 8,201,366 B2 | * | 6/2012 | Sprague | E06B 3/5454 |
| | | | | 52/204.62 |
| 8,226,140 B1 | * | 7/2012 | Dietrich | B66C 1/42 |
| | | | | 294/119.1 |
| 8,616,599 B2 | * | 12/2013 | Motonaga | B25J 15/026 |
| | | | | 294/119.1 |
| 9,073,217 B2 | * | 7/2015 | Xiao | F16H 19/005 |
| 9,470,338 B2 | * | 10/2016 | Bouchard | F16L 1/09 |
| 2007/0013199 A1 | * | 1/2007 | Hall | B66C 1/68 |
| | | | | 294/106 |
| 2007/0051213 A1 | * | 3/2007 | Tyler | B25B 5/12 |
| | | | | 81/367 |
| 2011/0154633 A1 | * | 6/2011 | Sprague | E04F 11/1851 |
| | | | | 29/239 |
| 2014/0331831 A1 | * | 11/2014 | King | B25B 23/1425 |
| | | | | 81/479 |

* cited by examiner

DRIVE SHAFT PRESS

FIELD

The subject matter described herein relates in general to presses and, more particularly, to a drive shaft press.

BACKGROUND

Modern vehicles commonly come in a variety of platform sizes and in a variety of models on a particular platform size. The drive systems for these vehicles can vary based on the platform, the model, and the drive configuration (e.g., front wheel drive, rear wheel drive, and all-wheel drive). These differing drive systems will have differing drive shafts, differentials, transfer cases, etc. The drive shafts are typically press-fit into the differential or transfer cases. The press fitting is typically done with press equipment that is specifically designed for a particular platform, model and drive configuration. As a result, an assembly plant will require many different pieces of equipment to meet the press fitting demands and must coordinate the availability of these different pieces of equipment with production schedules and changes.

Modern press-fitting equipment uses a PLC controlled servo system to perform the press-fitting operation. The use of PLC controlled servo systems makes the press-fitting equipment more complicated. Additionally, PLC controlled servo systems are expensive and may require a customized program for each vehicle configuration. As such, the cost to provide for press-fitting equipment for an assembly plant that produces a variety of vehicle configurations can be excessive.

Accordingly, there is a need for a simplified drive press system that can be utilized on a variety of vehicle configurations. Additionally, it would be advantageous if the cost for the drive press system can be reduced over that of PCL controlled servo systems.

SUMMARY

A simplified drive press system is operable to press-fit a pair of first workpieces into a second workpiece. The drive press system uses a simplified mechanical arrangement to translate an input torque into movement of a pair of drive arms toward and away from one another. Yokes of differing configurations may be attached to the drive arms to accommodate a variety of different workpieces. A nut runner may be used to supply a drive torque to the gear assembly and provide a controlled input torque and control the movement of the drive arms. An overall reduction may be utilized that balances a desired movement resolution with the desire to detect changes in input torque. A gear ratio may be between about 2:3 and about 1:20. The gear assembly may provide a resolution of about 0.1 inch of rack movement per revolution of the nut runner. The nut runner may be programmable to provide a desired movement of the drive arms while monitoring the input torque to detect when a fully press-fitted condition is realized.

In one respect, the present disclosure is directed to a press system having at least one moveable rack which is operatively connectable with a first workpiece and operable to move the first workpiece relative to a second workpiece. The at least one rack has a plurality of gear teeth. A mechanical drive system is operable to move the at least one rack and a connected first workpiece relative to the second workpiece. The drive system includes a gear assembly operatively coupled to the at least one rack and an input member operatively coupled to the gear assembly. Rotation of the input member drives rotation of the gear assembly. A nut runner is operatively connectable to the input member. The nut runner supplies a drive torque to the input member to drive movement of the at least one rack and press-fit the first and second workpieces together.

In another respect, the present disclosure is directed to a mechanical press system having a pair of moveable racks. The racks each have a plurality of teeth and are operable to move toward and away from one another to press-fit first workpieces engaged with the racks into a second workpiece which is stationary relative to the racks. There is a removable yoke associated with each rack. Each of the yokes engages with one of the first workpieces and drives movement of the first workpiece with movement of the rack. A mechanical drive system is operable to move the rack. The drive system includes a gear assembly operatively coupled to the racks and an input member operatively coupled to the gear assembly. Rotation of the input member drives rotation of the gear assembly which drives movement of the racks. A nut runner is connectable to the input member and is operable to supply a drive torque to the input member to drive movement of the racks and press-fit the first and second workpieces together.

DETAILED DESCRIPTION

Figure 1:
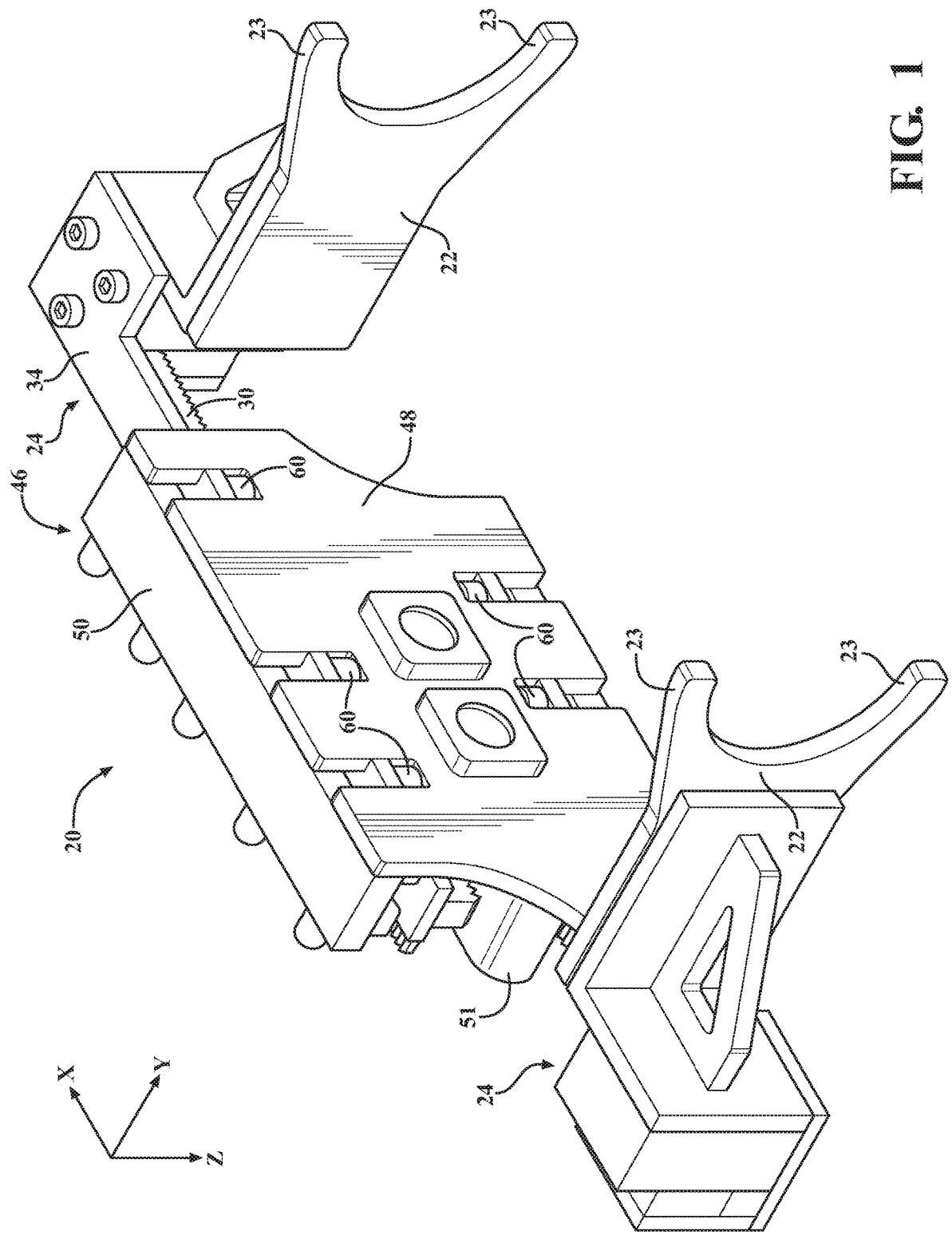
FIG. 1 is perspective view of an exemplary simplified mechanical press system.
Figure 2:
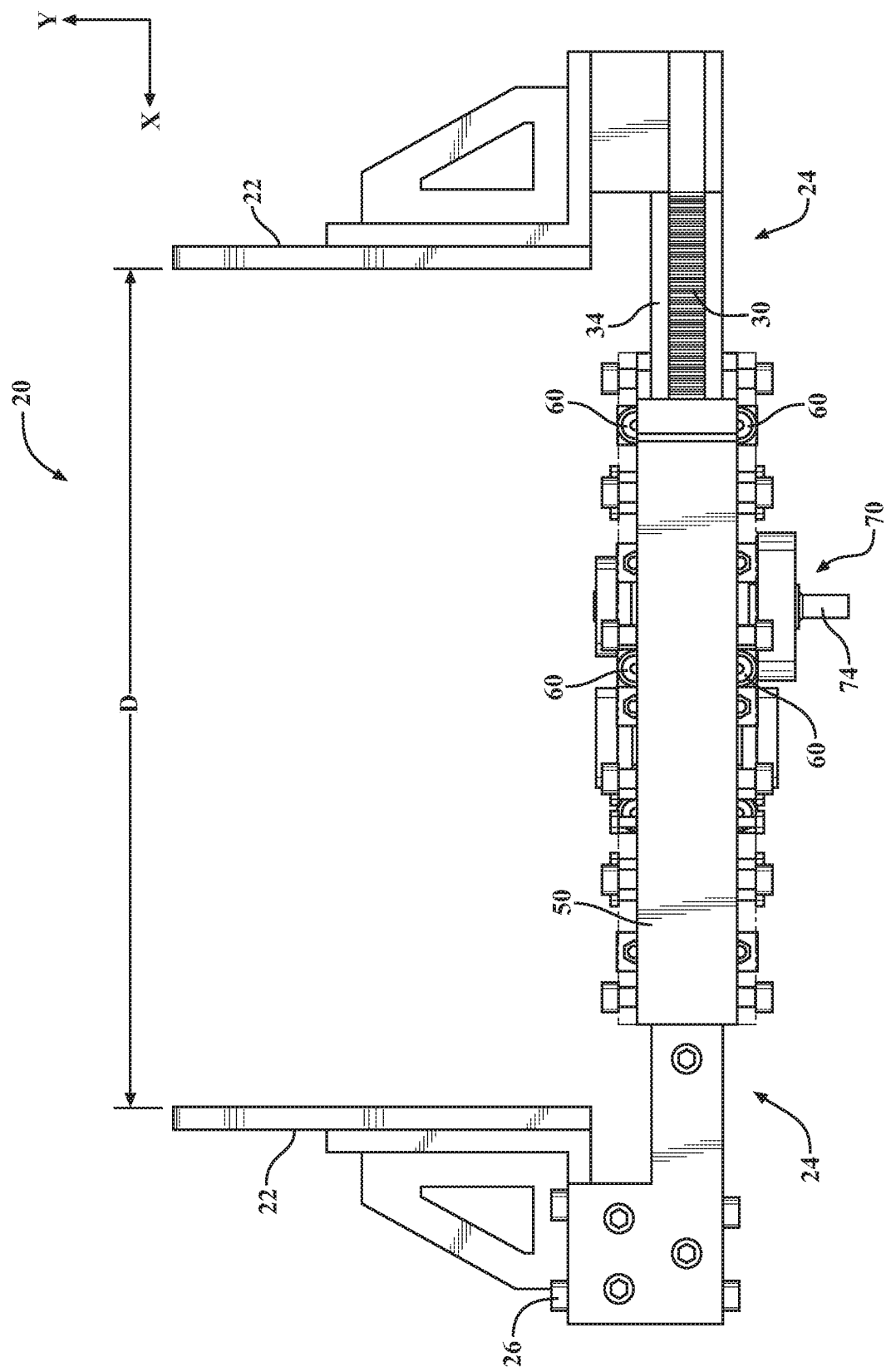
FIG. 2 is a side view of the press system of FIG. 1.
Figure 3:
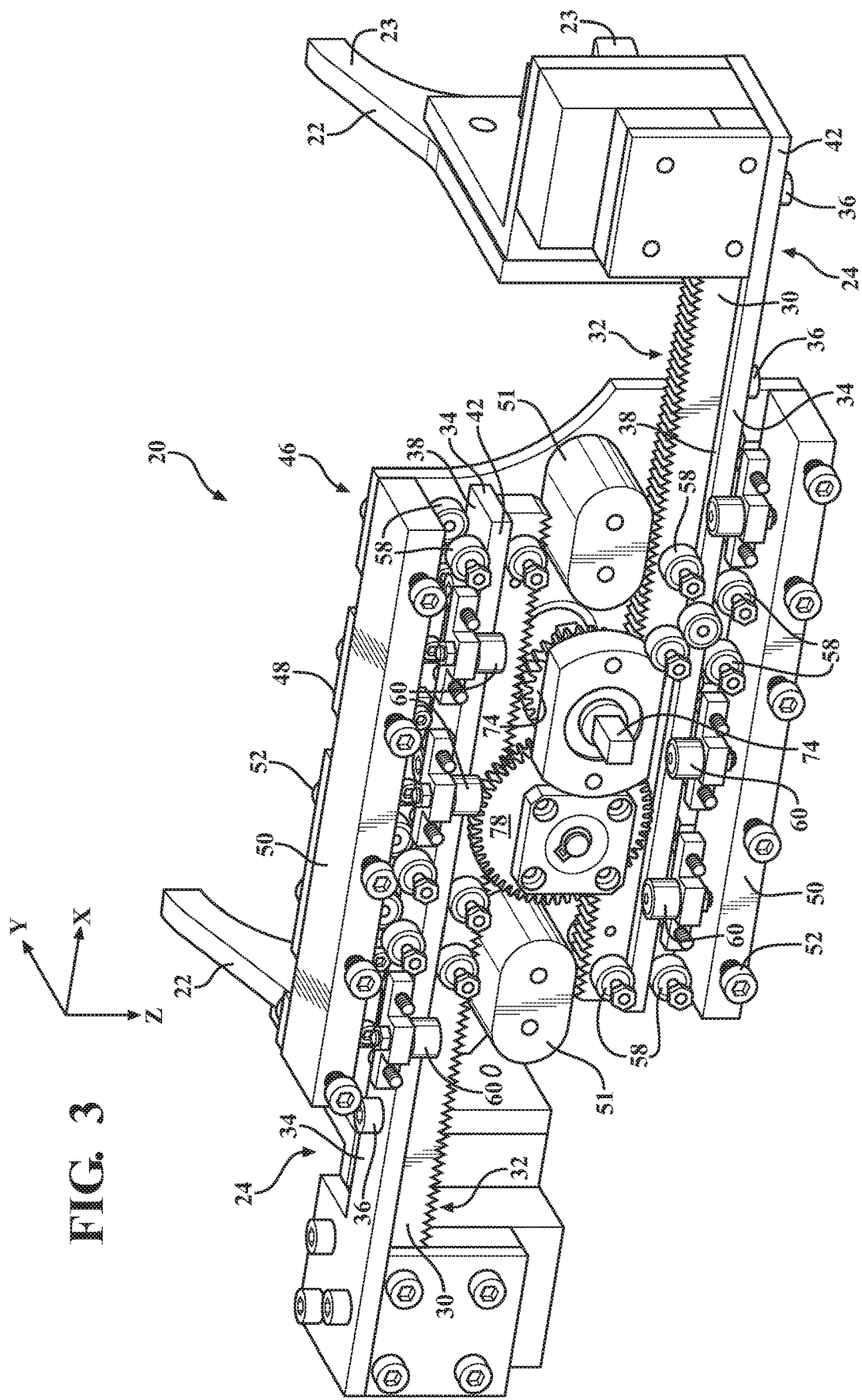
FIGS. 3 and 4 are perspective views of the press system of FIG. 1.
Figure 4:
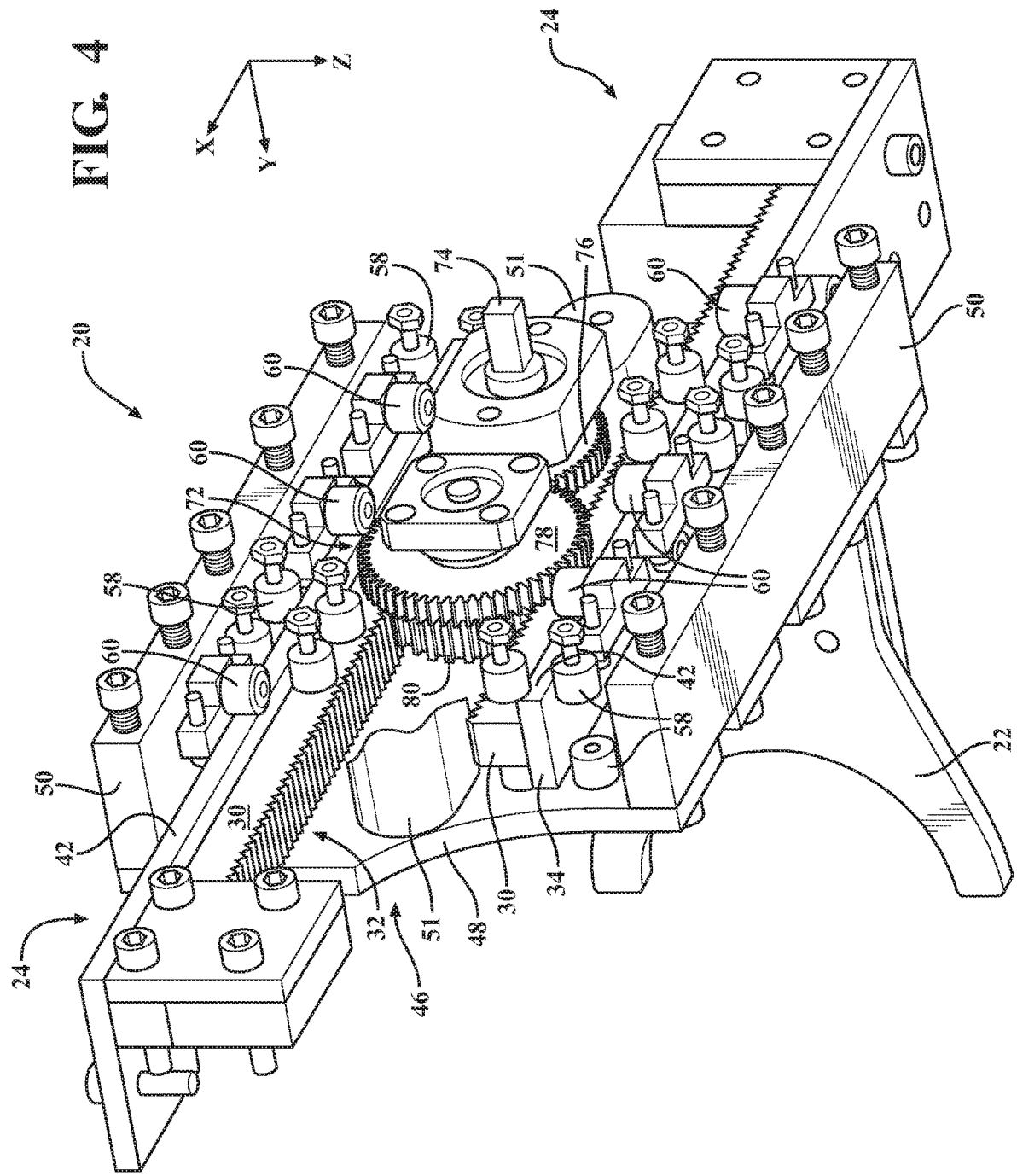
Figure 5:
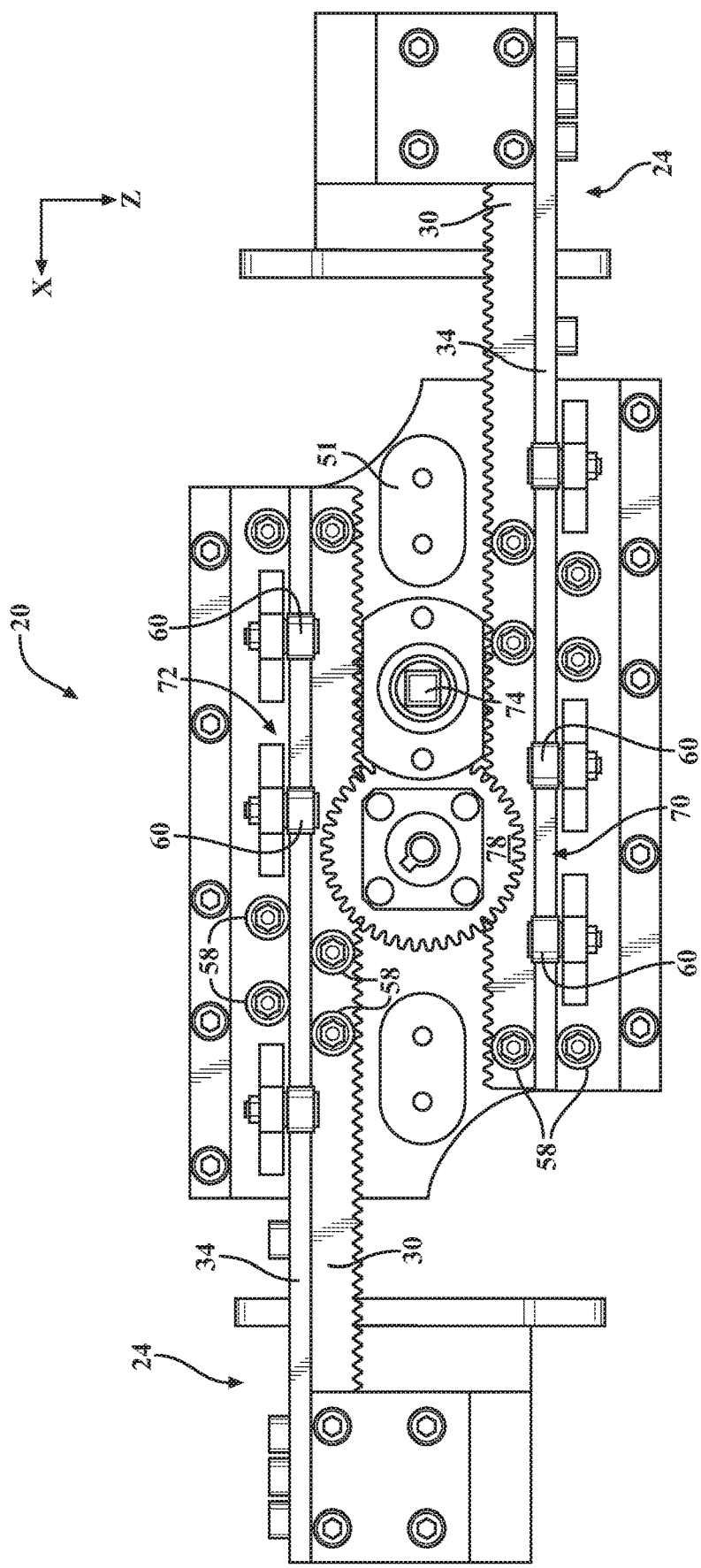
FIG. 5 is bottom view of the press system of FIG. 1.
Figure 6:
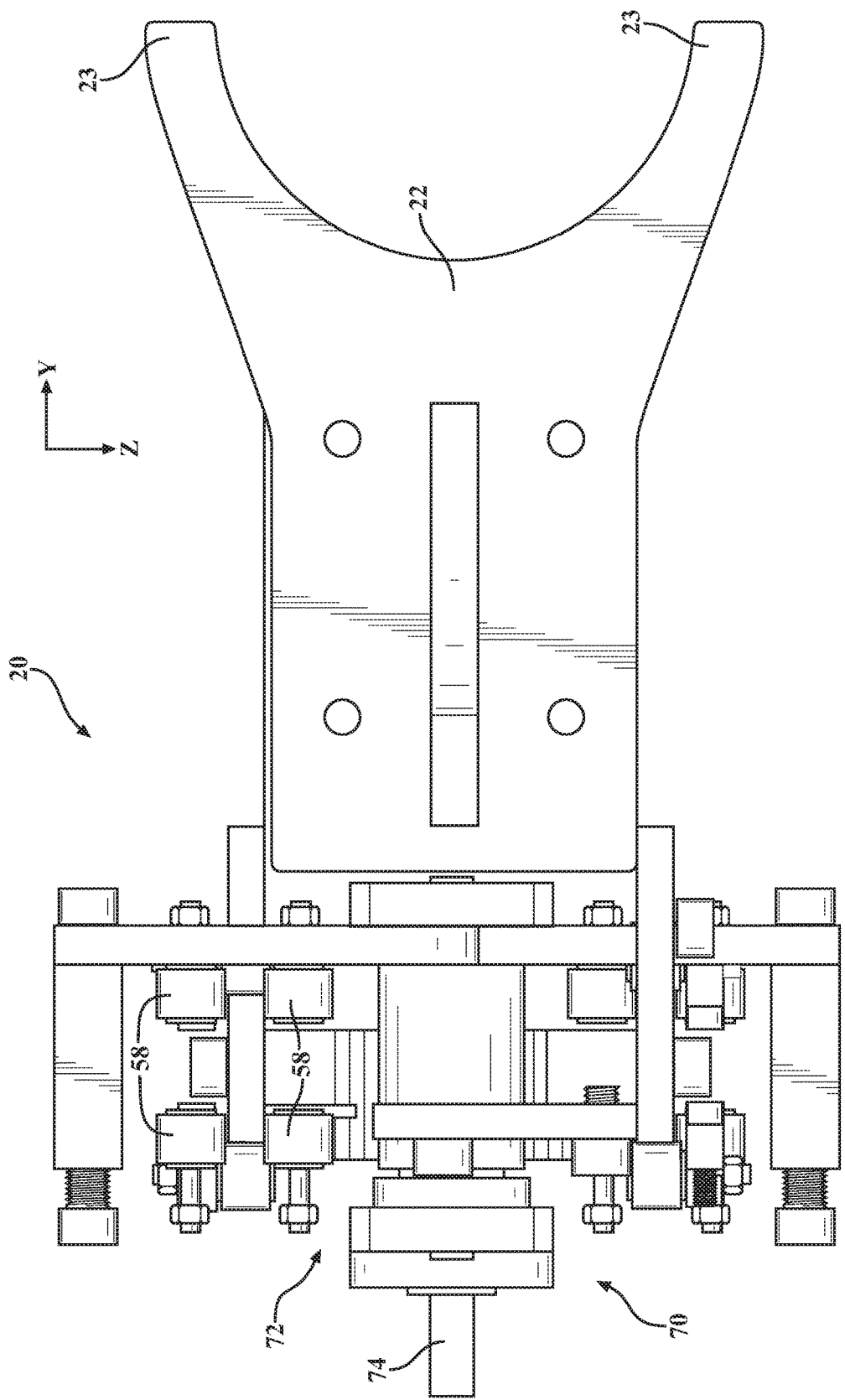
FIG. 6 is an end side view of the press system of FIG. 1.

This detailed description relates to a simplified drive press system operable to press-fit a pair of first workpieces into a second workpiece. The drive press system uses a simplified mechanical arrangement to translate an input torque into movement of a pair of drive arms toward and away from one another. Yokes of differing configurations may be attached to the drive arms to accommodate a variety of different workpieces. A nut runner may be used to supply a drive torque to the gear assembly and provide a controlled input torque and control the movement of the drive arms. An overall reduction may be utilized that balances a desired movement resolution with the desire to detect changes in input torque. A gear ratio may be between about 2:3 and about 1:20. The gear assembly may provide a resolution of about 0.1 inch of rack movement per revolution of the nut runner. The nut runner may be programmable to provide a desired movement of the drive arms while monitoring the input torque to detect when a fully press-fitted condition is realized.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1-6, an exemplary simplified mechanical press system 20 is shown. It should be appreciated that in the views, various components of press system 20 may be omitted to allow illustration of other components. Press system 20 is configured and arranged to press workpieces, such as drive shafts, differentials and transfer cases, together using a controlled input force. Press system 20 is scalable and may come in various sizes to accommodate workpieces of differing sizes, shapes and input force requirements. The scalable nature allows for a standardized construction to be implemented in an assembly plant to meet the various production demands and vehicle configurations. The use of standardized construction may allow for the use of standard input devices to power press system 20 using the same or modified programming.

Figure 7:
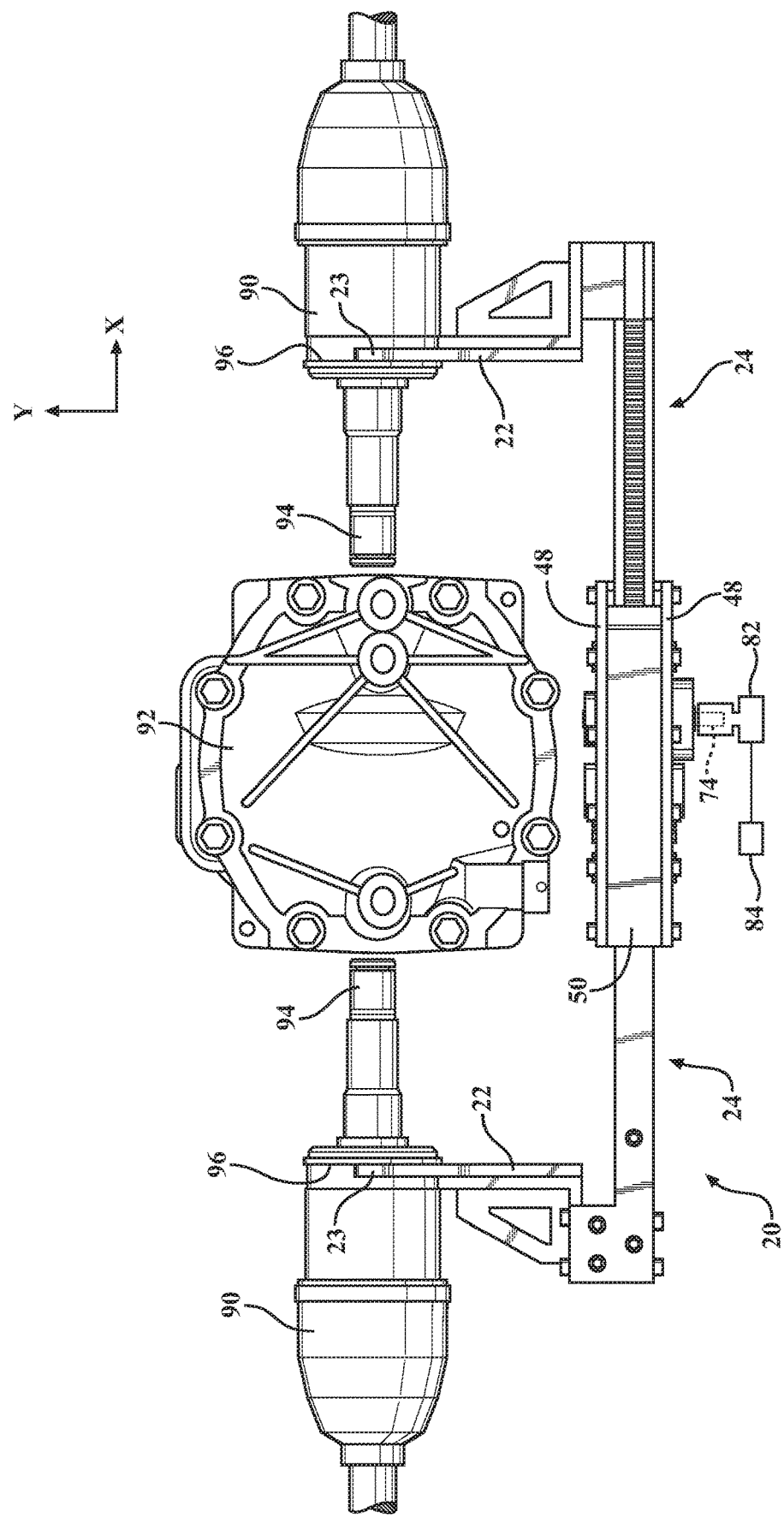
FIGS. 7 and 8 are side views of the press system of FIG. 1, showing an exemplary pair of drive shafts and a differential in an initial position and an assembled position, respectively.
Figure 8:
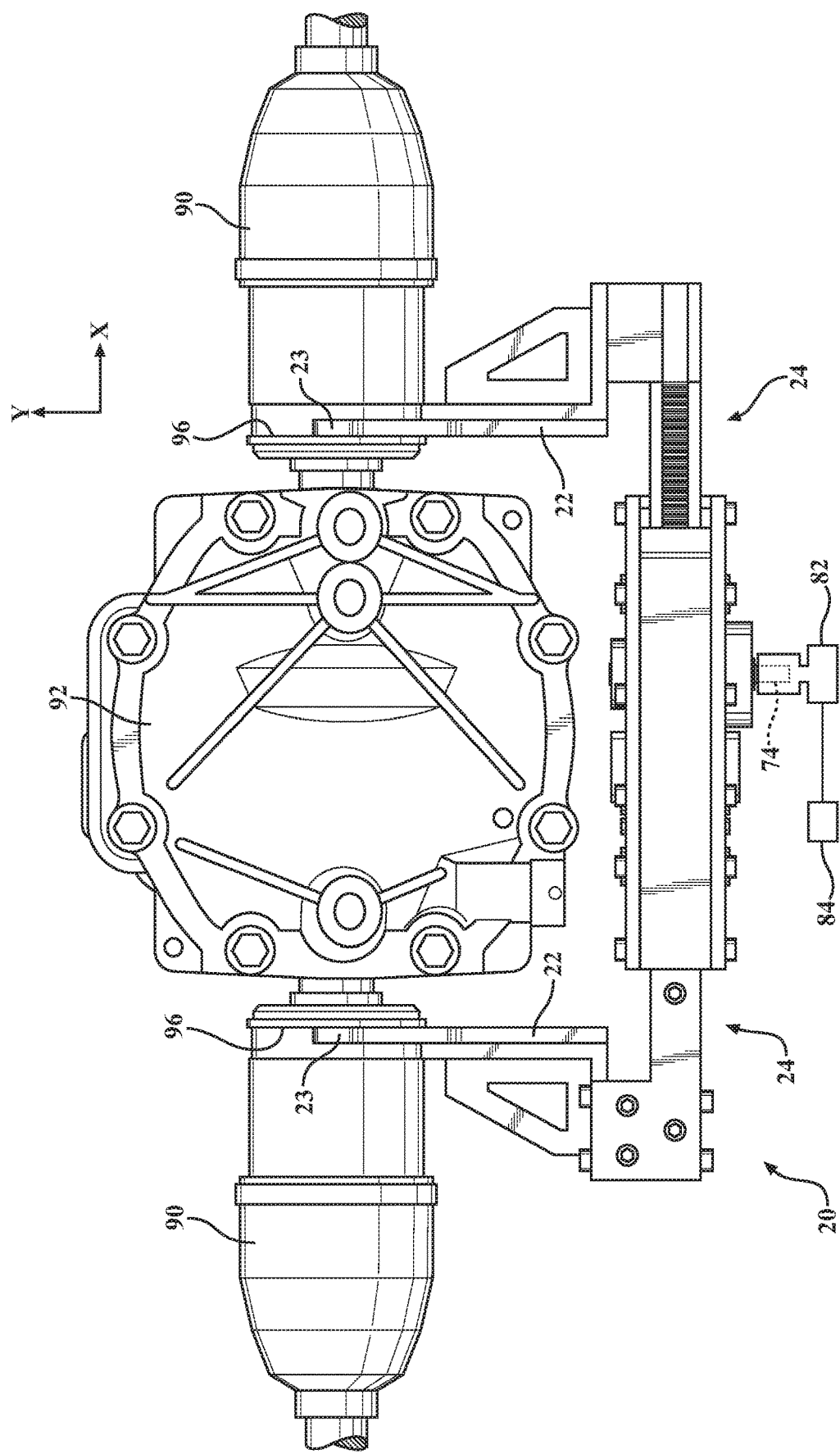

In one or more arrangements, press system 20 includes a pair of yokes 22 operatively connected to pair of drive arms 24. Yokes 22 may include fingers 23 that are configured to support workpieces, such as shown in FIGS. 7 and 8. Because the workpieces may come in a variety of shapes and sizes, yokes 22 and fingers 23 may also come in a variety of shapes and sizes, as needed, to meet the needs of the particular workpieces. Yokes 22 may be removably connected to drive arms 24 to allow yokes 22 of differing sizes, shapes and configurations to be coupled thereto. This allows press system 20 to accommodate differing workpieces. For example, yokes 22 may be connected to drive arms 24 by threaded fasteners 26 or the like.

In one or more arrangements, drive arms 24 may include a rack 30 having a plurality of teeth 32 thereon. Each rack 30 may be coupled to a backer plate 34, such as by fasteners 36. Backer plate 34 may provide a rigid structure to support rack 30 and the press-fitting of the workpieces together. Backer plate 34 may have opposite main surfaces 38 separated by side surfaces 42. Rack 30 may be coupled to one of the main surfaces 38. Drive arms 24 are operable to move relative to one another, such as along an X-axis, which in turn moves yokes 22 toward and away from one another to press-fit the workpieces together, as described below. The distance D separating yokes 22 changes as drive arms 24 move along the X-axis.

In one or more arrangements, press system 20 includes a base assembly 46 that may form the structural frame. Base assembly 46 may include a pair of plates 48 and a pair of side members 50 and spacers 51 extending therebetween and spacing plates 48 apart from one another, such as along a Y-axis by way of example. Plates 48 may be attached to side members 50 and spacers 51 with fasteners 52, by way of example. Base assembly 46 may enclose (within plates 48 and side members 50) a majority of a mechanical drive system 70 operable to drive movement of drive arms 24 along the X-axis and components of press system 20.

In one or more arrangements, drive arms 24 are partially disposed within base assembly 46 and move relative thereto. A plurality of cam followers 58 may be coupled to plates 48 within base assembly 46. Cam followers 58 coupled to each plate 48 may be spaced apart from one another both along a Z-axis and along the X-axis, as shown. The spacing of cam followers 58 may form a first guide channel within which drive arms 24 move. For example, cam followers 58 may engage with main surfaces 38 of backer plate 34 to guide the movement of drive arms 24 relative to the Z-axis as drive arms 24 move along the X-axis. Another plurality of cam followers 60 may be coupled to side members 50 within base assembly 46. Cam followers 60 coupled to each side member 50 may be spaced apart from one another both along the Y-axis and along the X-axis, as shown. The spacing of cam followers 60 may form a second guide channel within which drive arms 24 move. For example, cam followers 60 may engage with side surfaces 42 of backer plate 34 to guide the movement of drive arms 24 relative to the Y-axis as drive arms 24 move along the X-axis. In this arrangement, cam followers 58, 60 together may guide and limit the movement of drive arms 24 relative to the Z-axis and Y-axis as drive arms 24 move along the X-axis. Cam followers 58, 60 may be a bearing with a hardened exterior surface by way of non-limiting example.

In one or more arrangements, press system 20 may include the drive system 70. Drive system 70 may include a gear assembly 72 operatively connected to an input member 74 and to drive arms 24. For example, gear assembly 72 may include an input gear 76 coupled to input member 74 and engaged with a reduction gear 78 which may be coupled to a drive gear 80 which may be engaged with both racks 30. Input gear 76 and input member 74 may be locked together such that they both rotate in unison. For example, input member 74 may be keyed into input gear 76 such that relative rotation is prevented and rotation of input member 74 drives rotation of input gear 76. Reduction gear 78 and drive gear 80 may be locked together such that they both rotate in unison. For example, reduction gear 78 and drive gear 80 may be fixedly attached or keyed to one another such that relative rotation is prevented and rotation of reduction gear 78 drives rotation of drive gear 80. In this manner, rotation of input member 74 in a first rotational direction drives movement of drive arms 74 in a first motion toward one another along the X-axis and rotation of input member 74 in a second rotational direction, opposite the first rotational direction, drives movement of drive arms 74 in a second motion away from one another along the X-axis. Thus, the distance D between yokes 22 may be altered by rotation of input member 74 and workpieces may be press-fit together.

In one or more arrangements, input gear 76, reduction gear 78 and drive gear 80 each has a plurality of teeth around its perimeter. The number of teeth of each gear 76, 78, 80 and the number of teeth per inch on rack 30 control the rate of linear movement of drive arms 24 as a function of the rotation of input member 74. Input member 74, as discussed below, may be rotated with a nut runner. The press-fitting of the workpieces together with press system 20 may be controlled by the gear ratio between input gear 76 and reduction gear 78, the number of teeth on drive gear 80 and the number of teeth per inch on racks 30 and may allow for greater resolution of the press-fitting operation. For example, a gear ratio of less than 1:1 may allow for multiple revolutions of input member 74 for each increment of linear movement of drive arms 24. The greater the resolution, the greater the control over the movement of the drive arms 24 and the more precisely the workpieces may be moved relative to one another by drive arms 24. The greater resolution, however, may result in less input torque feedback. Input torque feedback may be beneficial in evaluating the force imparted in the press-fitting operation and the occurrence of a change in force required for further linear movement of drive arms 24. For example, the workpieces may include a snap ring or other positive engagement feature that engages when a predetermined relative position between the workpieces occurs. The positive engagement may result in an increase in resistance to further relative movement and may correspond to a fully press-fit engagement between the workpieces. Detection of the increase in input torque may be indicative of the completion of the press-fitting operation and serve as a signal to stop further movement of drive arms 24 toward one another. Rapid detection of the increased input torque may inhibit or prevent over compression of the workpieces together by allowing the nut runner operation to be ceased more quickly. Thus, it may be advantageous to provide a balance between resolution and input torque change detection.

In one or more arrangements, press system 20 uses a gear ratio (the ratio between input gear 76 and reduction gear 78), the number of teeth on drive gear 80 and the number of teeth per inch on racks 30 (collectively, the "overall reduction") to balance between providing increased resolution and input torque change detection. For example, in one or more arrangements, press system 20 may use an overall reduction that provides a resolution that for each revolution of input member 74 drive arms 24 move less than about 0.1 inches (about 1 inch of travel for every 10 revolutions). In one or more arrangements, the overall reduction is selected so that about 1 inch of movement of drive arms 24 is achieved with between preferably 10 and 100 revolutions of input member 74 and, more preferably with about 50 revolutions. As another example, in one or more arrangements press system 20 may use an overall reduction that provides for an input torque detection in the range of about 30-250 Nm per revolution of input member 74. In one or more arrangements, press system 20 may have a gear ratio of between about 2:3 and about 1:20. By way of example, input gear 76 may have 20 teeth, reduction gear 78 may have 200 teeth (a 1:10 gear ratio), drive gear 80 may have 20 teeth and racks 30 may have 20 teeth per inch thereby providing a resolution of about 0.1 inches of movement for each rotation of input member 74. Thus, the resolution may be varied by adjusting the gear ratio, the number of teeth on drive gear 80, and/or the number of teeth 32 per inch on racks 30.

In one or more arrangements, as shown in FIGS. 7 and 8, a nut runner 82 is used to drive rotation of input member 74. For example, electric or pneumatic nut runners available from Atlas Copco, Coretec or other nut runner companies may be used to drive rotation of input member 74. The nut runner 82 may provide a controlled input torque and a controlled rate of rotation. The nut runner 82 may be connected to a controller 84 that measures the number of revolutions and the applied input torque and controls the rate of rotation and input torque applied. In one or more arrangements, the nut runner 82 may be programmed to provide a desired operation of press system 20. The programming may vary based on the particular workpieces to be press-fit together. For example, different workpieces may require a lower or greater input torque and/or may require less or more travel of drive arms 24 for full press-fit engagement. As such, various programs may be provided for the nut runner 82 so that the nut runner 82 and the press system 20 may be used with workpieces having differing press-fitting needs/requirements. The controller 84 may also record the press-fitting operation and the parameters of the nut runner 82 to provide a record of the press-fitting operation.

In one or more arrangements, as shown in FIGS. 7 and 8, press system 20 is configured to press-fit a pair of drive shafts 90 into a differential 92. For example, drive shafts 90 may each be coupled to a yoke 22 with fingers 23 engaged with complementary grooves or recesses of drive shafts 90 and ends 94 aligned with openings in differential 92. Yokes 22 may engage with drive shafts 90 and push drive shafts 90 into differential 92. For example, fingers 23 may push on a shoulder or rib 96 on drive shafts 90 to drive movement of drive shafts 90 into differential 92 and press-fit drive shafts 90 to differential 92. In use, differential 92 is placed in a holder/rack (not shown) and drive shafts 90 are arranged in yokes 22 with fingers 23 adjacent shoulder 96 and ends 94 aligned with corresponding openings on differential 92. If needed, input member 74 is rotated to move drive arms 24 to accommodate the placement of differential 92 and drive shafts 90. Once in position, input member 74 may be rotated in a direction corresponding to drive arms 24 moving toward one another which will cause ends 94 to enter into the corresponding openings in differential 92. For example fingers 23 of yokes 22 may push on shoulders 96 of drive shafts 90 to drive movement of drive shafts 90 into differential 92. As explained above, a nut runner 82 may be used to drive rotation of input member 74. Input member 74 continues to be rotated until drive shafts 90 are fully press-fitted within differential 92. The fully press-fitted condition may be detected by a change in the required input torque on input member 74 to continue rotation in the press-fitting direction. It should be appreciated that during the press-fitting operation and prior to being in the fully press-fit position, the required input torque to drive movement of drive arms 24 may increase as a function of distance traveled. The detection of the fully press-fit position takes into account the possibility of increasing input torque required prior to the fully press-fit condition being realized and may also take into account the distance traveled by drive arms 24. After the fully press-fit condition is realized, the nut runner 82 will cease rotating input member 74. The cessation may be automatic. After the fully press-fit position is realized, input member 74 may be rotated in an opposite direction, if needed, to remove loading between yokes 22 and the workpieces and allow the workpieces to be removed from press system 20.

It will be appreciated that arrangements described herein can provide numerous benefits, including one or more of the benefits mentioned herein. For example, arrangements described herein may provide simplified mechanical press system 20 that may accommodate a variety of workpieces. Press system 20 may use a commercially available nut runner 82 that can measure the input torque and the number of revolutions and control the same to press-fit workpieces together in a controlled and recordable manner. The nut runner program may be configured for the particular workpieces. The use of a simplified mechanical press and the programmable nut runner 82 may allow for a lower cost press system 20 that may accommodate a variety of workpiece configurations and press-fitting requirements.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention.

What is claimed is:

1. A press system comprising:
    at least one rack whose movement is guided along an X-axis and limited relative to a Z-axis and a Y-axis by a plurality of cam followers, the at least one rack being operatively connectable with a drive shaft oriented along the X-axis for axial pushing action on the drive shaft along a length thereof, the at least one rack having a plurality of gear teeth;
    a mechanical drive system operable to move the at least one rack and the connected drive shaft relative to a differential, the drive system including a gear assembly operatively coupled to the gear teeth of the at least one rack, whose rotation drives movement of the at least one rack to axially push the drive shaft relative to the differential and press-fit the drive shaft and the differential together, and a culminating nut-runner-compatible input member operatively coupled to the gear assembly, whose rotation drives rotation of the gear assembly; and
    a nut runner operatively connected to the mechanical drive system at the input member, the nut runner operable to supply a drive torque to the input member to drive rotation thereof.

2. The press system of claim 1, wherein the gear assembly and the at least one rack provide a resolution of about 1 inch of travel for between 10 to 100 revolutions of the input member.

3. The press system of claim 2, wherein the gear assembly and the at least one rack provide a resolution of about 1 inch of travel for about 50 revolutions of the input member.

4. The press system of claim 1, wherein the at least one rack is a pair of moveable racks that are each operatively connectable with a different drive shaft for axial pushing action on the drive shaft, and that move relative to one another with rotation of the gear assembly.

5. The press system of claim 1, wherein the gear assembly includes an input gear rotating with rotation of the input member and a reduction gear engaged with the input gear such that rotation of the input member drives rotation of the reduction gear.

6. The press system of claim 5, wherein the gear assembly includes a drive gear rotating with rotation of the reduction gear, the drive gear being engaged with the at least one rack such that the drive gear drives movement of the at least one rack due to rotation on the input member.

7. The press system of claim 6, wherein the input gear and the drive gear have a same number of gear teeth.

8. The press system of claim 5, wherein a gear ratio between the input gear and the reduction gear is between about 2:3 and about 1:20.

9. The press system of claim 1, wherein the nut runner is a programmable nut runner, the programmable nut runner operable to:
    supply the drive torque to the input member by providing a controlled input torque and a controlled rate of rotation to the input member;
    monitor the input torque; and
    in response to detecting that the input torque is indicative of a fully press-fit condition of the drive shaft and the differential, cease supplying the drive torque to the input member.

10. The press system of claim 1, wherein the at least one rack moves about 0.1 inch for each revolution of the input member.

11. A mechanical press system comprising:
    a pair of moveable racks whose movement is guided along an X-axis and limited relative to a Z-axis and a Y-axis by a plurality of cam followers, the racks having a plurality of gear teeth and operable to move toward and away from one another along the X-axis;
    a removable yoke connected to each rack, each yoke bifurcated to include two fingers orthogonal to the X-axis, and define a recess between the fingers opening orthogonally away from the X-axis, each yoke operable via the recess to receive a drive shaft having a circumferential shoulder along a length thereof and oriented along the X-axis, and operable via the fingers to engage with the drive shaft for axial pushing action on the drive shaft circumferentially along the shoulder thereof with movement of the rack;
    a mechanical drive system operable to move the racks and the drive shafts engaged with the yokes relative to a differential which is stationary relative to the racks, the drive system including a gear assembly operatively coupled to the gear teeth of the racks, whose rotation drives movement of the racks toward and away from one another, including toward one another to axially push the drive shafts relative to the differential and press-fit the drive shafts into the differential, and a culminating nut-runner-compatible input member operatively coupled to the gear assembly, whose rotation drives rotation of the gear assembly; and
    a nut runner operatively connected to the mechanical drive system at the input member, the nut runner operable to supply a drive torque to the input member to drive rotation thereof.

12. The press system of claim 11, wherein the gear assembly includes an input gear rotating with rotation of the input member and a reduction gear engaged with the input gear such that rotation of the input member drives rotation of the reduction gear.

13. The press system of claim 12, wherein the gear assembly includes a drive gear rotating with rotation of the reduction gear, the drive gear being engaged with the gear teeth of the racks such that the drive gear drives movement of the racks due to rotation on the input member.

14. The press system of claim 13, wherein rotation of the drive gear in a first direction drives movement of the racks towards one another and rotation of the drive gear in a second direction opposite the first direction drives movement of the racks away from one another.

15. The press system of claim 14, wherein the input gear and the drive gear have a same number of gear teeth.

16. The press system of claim 15, wherein a gear ratio between the input gear and the reduction gear is between about 2:3 and about 1:20.

17. The press system of claim 11, wherein the gear assembly and the racks provide a resolution of about 1 inch of travel for between 10 to 100 revolutions of the input member.

18. The press system of claim 17, wherein the nut runner is a programmable nut runner, the programmable nut runner operable to:
supply the drive torque to the input member by providing a controlled input torque and a controlled rate of rotation to the input member;
monitor the input torque; and
in response to detecting that the input torque is indicative of a fully press-fit condition of the drive shafts and the differential, cease supplying the drive torque to the input member.

19. The press system of claim 11, wherein each rack moves about 0.1 inch for each revolution of the input member.

\* \* \* \* \*